Feb. 19, 1952 N. F. MARTIN 2,586,362

DUAL POINT PHONOGRAPH PICKUP STYLUS

Filed March 11, 1949

INVENTOR.

Norman F. Martin

BY

Clarence J. Loftus

Atty.

Patented Feb. 19, 1952

2,586,362

UNITED STATES PATENT OFFICE 2,586,362

DUAL POINT PHONOGRAPH PICKUP STYLUS

Norman F. Martin, Fort Wayne, Ind., assignor to The Magnavox Company, Fort Wayne, Ind., a corporation of Delaware Application March 11, 1949, Serial No. 80,930

6 Claims. (Cl. 179—100.41)

This invention relates to phonograph pickups, and has, as its primary aim, the provision of a tone arm and pickup cartridge capable of playing standard groove or microgroove records interchangeably on any usual type of record changer. One aspect of this general aim is to provide a pickup capable of high fidelity reproduction, and to provide means for compensating for the differing characteristics of sensitivity, frequency response and tracking characteristics that are ordinarily required in separate pickups especially designed for records of one type or the other. An additional aim is to provide a unit of sufficiently sturdy and rugged nature as to be adapted for use in home phonographs and automatic record changers.

It is believed well known that the provision of a pickup having all of these acceptable characteristics presents a problem so difficult that it has heretofore been regarded as next to impossible. It has therefore been common practice to provide phonographs designed to use both long playing records and the standard variety with a pair of separate tone arms; each with its own pickup cartridge designed specifically for only one type of record. But this does not offer an answer to the problem of producing a commercially acceptable record changer capable of handling either type record. Even if no form of automatic record changer is employed, the additional costs and mechanical complications involved in attempting to equip two separate, independent and different arms is substantial, but any attempt to provide two separate arms with devices to synchronize motion of both with the operation of a record changer is obviously so prohibitive that it has not been attempted commercially. The result is that manufacturers who have adapted their record changers to two-arm operation have merely provided an auxiliary arm that is manual, not automatic. It follows that the record changer is useful only with standard records, and the microgroove records may be played only manually, one at a time.

It is therefore the primary object of the present invention to provide a single pickup adapted to play either standard or microgroove records, so that a record changer having a single tone arm and utilizing only one pickup cartridge may be used to equal advantage with either type of record, so that a stack of either type of records may be automatically played by the changer.

This object is not to be accomplished merely by providing a pickup cartridge with two playing points, however; since although it is a fact that the stylus tip or playing point required for the microgroove records is smaller than the standard point, the difficulties involved in playing the two types of records interchangeably arise principally from other causes. For one thing, the microgroove records are recorded with less level than standard records (approximately 4.5 db. down) so that in any previously known form of pickup the voltage output of the cartridge is far less when playing a microgroove record than when used on a standard record. The amount of lateral and vertical compliance required for faithful tracking also differs between the two types of records, yet the range of sounds to be reproduced is substantially the same in each case, with the result that problems of avoiding self-resonance and accomplishing proper damping without excess loss of sensitivity are rendered more complex.

It is, therefore, a further important object of the invention to provide an improved pickup which not only makes it possible to play either type of record on any conventional automatic changer, but provides high fidelity reproduction with either type, and functions without "needle talk," scratch or hiss, yet with fair uniformity of output from the phonograph amplifier without adjustment. This involves equalizing the voltage output from the cartridge when using the different types of records, as well as reconciling the variations in requirements of tracking resonance and compliance. In addition, it involves reconciling the normally conflicting requirements of sensitivity, damping, freedom from self-resonance, and a lateral and vertical compliance as required by the two types of records.

It is a further object of the invention to provide a pickup capable of satisfactory performance in the respects mentioned above, yet having ample physical strength to withstand rough use.

The principles of the present invention are particularly well suited to use in a crystal pickup and will accordingly be described in connection with a crystal, but the invention should not be understood as limited to crystal units, since the teachings herein are believed to be similarly applicable to pickups of any type having an electro-mechanical converter by which the mechanical vibrations of a stylus tip are converted into electrical energy.

The present preferred embodiment of the invention by which these objects are accomplished is illustrated in the drawings of this disclosure wherein.

Figure 1:
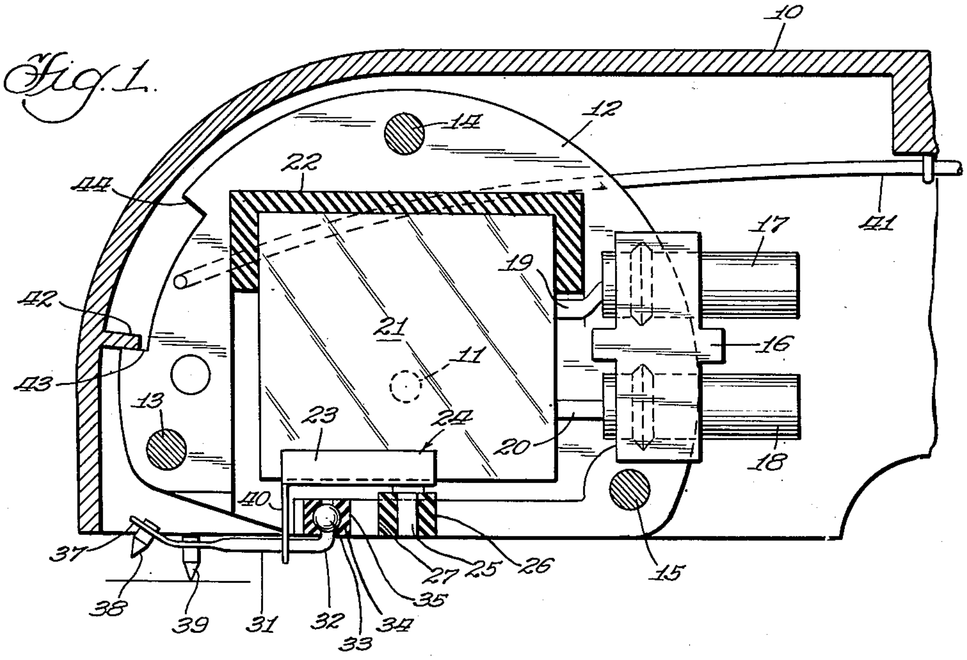
Figure 1 is a cross sectional view of the end of a phonograph tone arm, showing a pickup cartridge according to these teachings; the cartridge being illustrated in position to play microgroove records.

As shown, the tone arm 10 is hollow, preferably being constructed of molded plastic. A crystal cartridge consisting of a pair of identical and opposite housing portions 12 secured together by the machine screws or rivets 13, 14 and 15 is pivotally mounted on a pair of opposite trunnions 11. The cartridge is provided with an insulating block 16 in which output terminals 17 and 18 are mounted. These are electrically connected to the crystal by leads 19 and 20 in a manner well understood in the art, and supply the output voltage of the cartridge to the amplifier of the phonograph.

The crystal 21 is mounted in a resilient mounting block 22 with its twisting axis in vertical position on its center line. The lower edge of the crystal carries a fitting generally designated as 24 having a pair of opposite flanges 23 clamped to the opposite surfaces of the crystal. This fitting acts as a mounting for the journal or pivot stud 25 which supports the crystal at its lower end, and also functions as a crystal driving member. The journal 25 is supported by a bearing consisting of a resilient sleeve 26 clamped in a suitable socket 27 in the cartridge housing so that the lower edge of the crystal is adequately supported yet may twist on its axis. That is, the crystal is restrained against lateral movement but is capable of unrestricted twisting movement on the axis of the bearings and journal 25.

The stylus of the pickup has a shank portion 31 consisting of the short, slender piece of metal wire, with an upwardly curved portion 32 terminating in a ball 33 held in the resilient sleeve 34. The sleeve is clamped in a socket 35 in the housing. The end of the stylus shank opposite the bearing is flattened and has an offset portion 37 extending upwardly at an angle from the shank. A stylus tip or playing point 38 for standard records is mounted near the end of this offset portion, and a microgroove playing point 39 is mounted in the shank 31 at a point nearer the bearing ball 33.

Figure 2:
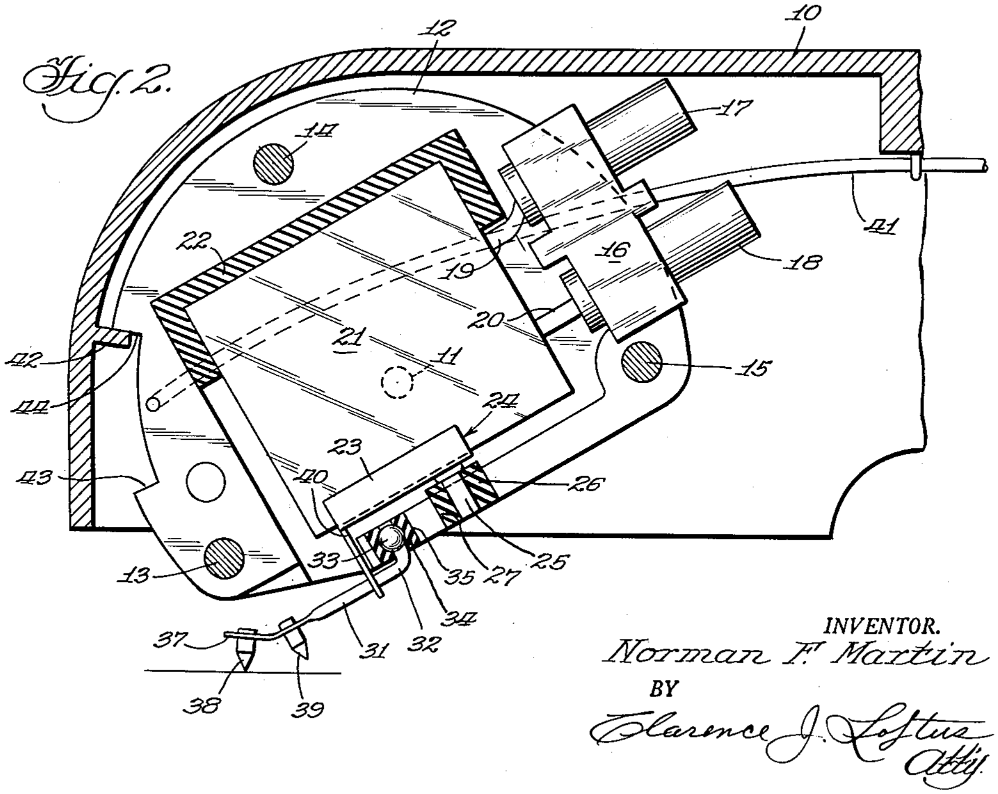
Figure 2 is a cross sectional view similar to Figure 1 showing the unit in position to play standard records.

The energy imparted to the stylus tip is transmitted upwardly from the stylus shank through the thin sheet metal strip 40 to the crystal. The two playing points may be interchangeably used by tilting the entire cartridge around the pivots 11 so that either point may be placed in position to engage the record. This may be done in any convenient manner, as by providing an actuating wire 41 extending to a shifting lever remotely positioned on the tone arm whereby the cartridge may be shifted back and forth between alternate position shown in Figures 1 and 2. Preferably a stop 42 is arranged to coact with coacting stop portions 43 and 44 to limit the movement of the cartridge.

The stylus according to these teachings may be a very small piece of slender wire so that its natural resonant frequency will be above the range of audibility and consequently beyond the range of frequencies that the pickup is designed to reproduce. It follows that the quality of reproduction will not be adversely affected by self-resonant characteristics of the stylus. At the same time, the shank portion 31 of the stylus is shorter than the entire length of the stylus between the bearing ball 33 and playing point 38. This alters the lever ratio between the playing points and the crystal to compensate for the different levels at which the microgroove and standard records are recorded, so that the voltage output of the cartridge is substantially the same with either type. In operation, substantially all of the energy imparted to either playing point will be effective to flex the crystal, but it is applied in a different manner due to the unequal distance between the two playing points and the stylus bearing and the differing degrees of compliance afforded. This provides proper lateral compliance to accomplish faithful tracking of either playing point in a record groove of the type for which it is suited. Thus the stylus will permit either point to track faithfully without needle talk and without causing undue record wear.

The characteristics of compliance, output and frequency response may be varied as required by altering the dimensional relationships of the stylus shank and offset with relation to the crystal. These characteristics may also be controlled by the use of a stylus pivot bearing of a greater or lesser degree of resiliency, so the bearing may act as a true pivot or allow a certain degree of lateral compliance in the bearing itself.

As before stated, the teachings of this invention find their greatest utility in connection with pickups of the crystal type, yet these teachings are equally applicable to other electromechanical transducers. It is therefore pointed out that while the invention has been described and illustrated in the present preferred embodiment it is not limited to the precise structure shown and described but extends to any variation or modification thereof within the terms of the appended claims.

Having thus described the invention, what I claim as new and desire to protect by United States Letters Patent is:

1. A phonograph pickup comprising a pickup cartridge, a stylus mounting on the lower edge of said cartridge, a stylus holder including a portion extending outwardly from said mounting and an offset extension at the end of said portion and extending upwardly with respect thereto, and a plurality of styli mounted on the stylus holder, one of said styli being mounted on said offset extension and the other being mounted on said outwardly extending portion whereby said styli are disposed at an angle with respect to one another.

2. A phonograph pickup comprising a pickup cartridge, a stylus bearing on the lower edge of said cartridge, a stylus holder including a portion extending laterally from said bearing and an offset extension at the end of said portion and extending upwardly with respect thereto, and a plurality of styli mounted on the stylus holder, one of said styli being mounted on said offset extension and the other being mounted on said laterally extending portion whereby said styli are disposed at an angle with respect to one another, one of said styli including a playing point adapted to fit the playing groove of a standard record, the other of said styli including a playing point adapted to fit the playing groove of a micro-groove record.

3. A phonograph pickup comprising a pickup cartridge, means for rotatably mounting said cartridge for movement through a predetermined angle about an axis disposed transversely of a record groove, a stylus mounting on one edge of said cartridge, a stylus holder including a portion extending outwardly from said mounting, a plurality of styli mounted on the stylus holder, means for mounting one of said styli at right angles to said holder, and means for mounting another stylus at a different angle to said holder, whereby said styli are disposed at an angle with respect to one another and either stylus may be moved into engagement with a record by rotating said cartridge through said predetermined angle.

4. A phonograph pickup comprising a pickup cartridge, means for rotatably mounting said cartridge for movement through a predetermined angle about an axis disposed transversely of a record groove, a stylus mounting on one edge of said cartridge, a stylus holder including a portion extending outwardly from said mounting, a plurality of styli mounted on the stylus holder, means for mounting one of said styli at right angles to said holder, and means for mounting another stylus at a different angle to said holder, whereby said styli are disposed at an angle with respect to one another and either stylus may be moved into engagement with a record by rotating said cartridge through said predetermined angle, one of said styli including a playing point adapted to fit the playing groove of a standard record, the other of said styli including a playing point adapted to fit the playing groove of a micro-groove record.

5. A phonograph pickup comprising a pickup cartridge, means for pivotally mounting said cartridge for movement through a predetermined angle about an axis disposed transversely of a record groove, a stylus mounting on the lower edge of said cartridge, a stylus holder including a portion extending outwardly from said mounting and an offset extension at the end of said portion and extending upwardly with respect thereto, and a plurality of styli mounted on the stylus holder, one of said styli being mounted on said offset extension and the other being mounted on said outwardly extending portion whereby said styli are disposed at an angle with respect to one another and either stylus may be moved into engagement with a record by pivoting said cartridge through said predetermined angle.

6. A phonograph pickup comprising a pickup cartridge, means for pivotally mounting said cartridge for movement through a predetermined angle about an axis disposed transversely of a record groove, a stylus bearing on the lower edge of said cartridge, a stylus holder including a portion extending laterally from said bearing and an offset extension at the end of said portion and extending upwardly with respect thereto, and a plurality of styli mounted on the stylus holder, one of said styli being mounted on said offset extension and the other being mounted on said laterally extending portion whereby said styli are disposed at an angle with respect to one another and either stylus may be moved into engagement with a record by pivoting said cartridge through said predetermined angle, one of said styli including a playing point adapted to fit the playing groove of a standard record, the other of said styli including a playing point adapted to fit the playing groove of a micro-groove record.

NORMAN F. MARTIN.

REFERENCES CITED

The following references are of record in the file of this patent:

UNITED STATES PATENTS

| Number | Name | Date |
|---|---|---|
| 1,570,297 | Dyer | Jan. 19, 1926 |
| 1,816,831 | Dunning | Aug. 4, 1931 |
| 2,181,437 | Norton | Nov. 28, 1939 |
| 2,320,572 | Dann | June 1, 1943 |

FOREIGN PATENTS

| Number | Country | Date |
|---|---|---|
| 502,445 | Great Britain | Mar. 17, 1939 |